United States Patent
Smith

(10) Patent No.: US 7,039,766 B1
(45) Date of Patent: May 2, 2006

(54) PRESCHEDULING SEQUENTIAL DATA PREFETCHES IN A PREEXISTING LRU CACHE

(75) Inventor: Kevin Frank Smith, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 09/689,488

(22) Filed: Oct. 12, 2000

(51) Int. Cl.
*G06F 12/12* (2006.01)

(52) U.S. Cl. .................. 711/137; 711/136; 711/137; 711/130; 711/133; 711/158; 711/159; 711/160; 709/200; 709/203; 709/217; 709/219; 709/227; 709/229

(58) Field of Classification Search ............... 711/118, 711/113, 136–137, 128, 213, 204, 158–160; 709/217–219, 201–203; 707/2, 10
See application file for complete search history.

(56) References Cited

U.S. PATENT DOCUMENTS

| | | | | |
|---|---|---|---|---|
| 4,490,782 A | * | 12/1984 | Dixon et al. ............... | 711/136 |
| 4,509,119 A | | 4/1985 | Gumaer et al. ............ | 364/200 |
| 4,980,823 A | | 12/1990 | Liu ............................ | 364/200 |
| 5,146,578 A | * | 9/1992 | Zangenehpour ............ | 711/122 |
| 5,293,609 A | * | 3/1994 | Shih et al. .................. | 711/136 |
| 5,325,504 A | * | 6/1994 | Tipley et al. ............... | 711/128 |
| 5,345,560 A | * | 9/1994 | Miura et al. ............... | 711/3 |
| 5,452,440 A | | 9/1995 | Salsburg ..................... | 395/463 |
| 5,461,718 A | * | 10/1995 | Tatosian et al. ............ | 711/157 |
| 5,490,113 A | * | 2/1996 | Tatosian et al. ........ | 365/189.05 |
| 5,537,568 A | * | 7/1996 | Yanai et al. ................ | 711/118 |
| 5,537,573 A | * | 7/1996 | Ware et al. ................. | 711/137 |
| 5,606,688 A | * | 2/1997 | McNutt et al. ............. | 711/170 |
| 5,664,147 A | * | 9/1997 | Mayfield .................... | 711/122 |
| 5,694,568 A | * | 12/1997 | Harrison et al. ........... | 711/137 |
| 5,701,426 A | | 12/1997 | Ryan .......................... | 395/403 |
| 5,706,467 A | | 1/1998 | Vishlitzky et al. ......... | 395/456 |
| 5,845,101 A | * | 12/1998 | Johnson et al. ............ | 712/207 |
| 5,889,993 A | * | 3/1999 | Kroeger et al. ............ | 717/128 |
| 5,956,746 A | * | 9/1999 | Wang ......................... | 711/137 |

(Continued)

FOREIGN PATENT DOCUMENTS

JP         404367954 A    * 12/1992

*Primary Examiner*—Matthew Kim
*Assistant Examiner*—Zhuo H. Li
(74) *Attorney, Agent, or Firm*—Kunzler & Associates

(57) ABSTRACT

A shared system memory, such as a cache, buffers Input/Output (I/O) requests between one or more host computers and one or more data storage servers or devices. The cache may be configured to operate natively as a least-recently-used (LRU)-only cache and may be optimized for random data accesses. Data buffered by the cache may be part of a sequential data stream for which prefetching data is desirable. A remote prefetch module is provided between the cache and the host to conduct prefetching without internally modifying the cache. The remote prefetch module maintains a model of the cache. Using the model, the prefetch module anticipates whether data is likely to be part of a sequential steam of data passed between a host and a data storage device. If so, the prefetch module schedules a prefetch of the data. The prefetch may be achieved by sending an I/O request to the data server or device. The remote cache model minimizes impacts to random access data hits by minimizing the likelihood of prefetching data which is not used and further enhances the efficiency of the successful identification of likely prefetch candidates.

24 Claims, 5 Drawing Sheets

U.S. PATENT DOCUMENTS

| | | | |
|---|---|---|---|
| 6,098,064 A * | 8/2000 | Pirolli et al. | 707/2 |
| 6,098,153 A * | 8/2000 | Fuld et al. | 711/134 |
| 6,134,643 A * | 10/2000 | Kedem et al. | 711/213 |
| 6,453,389 B1 * | 9/2002 | Weinberger et al. | 711/137 |
| 6,460,115 B1 * | 10/2002 | Kahle et al. | 711/122 |
| 6,622,168 B1 * | 9/2003 | Datta | 709/219 |

* cited by examiner

PRESCHEDULING SEQUENTIAL DATA PREFETCHES IN A PREEXISTING LRU CACHE

BACKGROUND OF THE INVENTION

1. The Field of the Invention

The present invention relates to cache management in data storage systems. More specifically, the present invention relates to prefetch scheduling in a preexisting LRU cache of a data storage system.

2. The Relevant Art

Cache memory is used in data storage systems to buffer frequently accessed data in order to allow the data to be accessed at a relatively high rate. The cache memory is a relatively small high speed memory operating on a host processor or between the host processor and relatively slower memory devices. Typical data storage systems using caching may include a cache directory or index of the data elements in a main memory of the hosts operating on the data storage system. The cache directory is referenced to provide an indication of whether or not each data element of the main memory resides in the cache memory at any give time, and if so, to indicate the present location of the data element in the cache memory. When a host processor requests an Input/Output (I/O) operation, the cache directory is first consulted to determine whether the requested data element is present in the cache memory and if so, to determine its location. When the data element is present in the cache memory, the data element can be quickly accessed, rather than having to be requested from a slower storage device.

Generally, in such systems, every time a data element is requested, a determination is made whether the accessed data is likely to be accessed again in the near future. If so, the accessed data element is copied or "staged" into the cache memory. In some data storage systems, requested data elements are always staged into the cache memory if they are absent from the cache memory. Some data storage systems are also responsive to explicit "prefetch" commands from the host computer to cause specified data to be staged into the cache, even though the specified data is not immediately accessed by the host computer.

Because the cache memory has a capacity that is smaller than the main memory, it is frequently necessary for data elements in the cache memory to be replaced or removed from the cache memory in order to provide space in the cache memory for more recently requested data elements. In general, for the cache memory to be useful, the data elements removed or replaced from the cache memory must be calculated to be less likely to be accessed in the near future than the new data elements being staged into the cache memory at the time the removal or replacement occurs.

Data storage systems that use disk drives for the main memory typically use random access memory (RAM) for the cache memory. In such a data storage system, the data elements in the cache memory are often logical tracks of data on the disks, although in many systems, the data records are blocks or records of data. The cache directory includes a directory entry for at least each data element stored in the cache. Each directory entry for each data element stored in the cache memory generally includes a pointer to the location of the data element in the cache memory. The cache directory can be a table including an entry for each data element stored in the disk storage. Alternatively, the directory may include a hash table for accessing lists of the directory entries so that the cache directory need not include any cache directory entries for data elements that are absent from the cache memory. In either case, any one of a plurality of data elements in the cache memory may be replaced or removed from the cache according to the particular cache management scheme being used to make room for another data element.

The performance of such a data storage system is highly dependent on the cache management scheme used for selecting the data element to be removed or replaced. The cache management scheme is implemented by a cache management system, or "cache manager," in the data storage system.

In one common cache management scheme, a cache manager is programmed to remove or replace the "least-recently-used" (LRU) data element in the cache memory. The least-recently-used data element is usually the data element accessed least recently by the host computer. The cache manager maintains an ordered list, or queue, of the data elements in the cache memory so that the cache manager can readily identify the least-recently-used data element. The queue is typically maintained in a doubly-linked list. When a data element is accessed, the data element is moved to the head of the queue, unless the data element is already at the head of the queue. This process is known as making the data element "young" in the cache and ensures that, when the queue is not empty, the least-recently-used data element in the cache memory will be located at the end of the queue and the most-recently-used element in the cache memory will be located at the head of the queue.

Data that is fetched into the cache memory may be described in two broad fashions. The first is random access data which denotes data that is needed for specific operations but which is not connected with other data in any manner. Many caching systems are configured for optimal performance when fetching random access data. The second type of data is known as sequential data, denoting that several elements of the data are used by a processor in a specific sequence, typically the sequence in which the data elements are stored on a storage device. Many systems that employ a dedicated or "native" LRU cache are only designed to store data accessed in random access operations and make no provision for accessing sequential data.

Attempts have been made to improve the performance of a native LRU cache when fetching sequential data. These solutions, however, require a modification in some fashion of the LRU cache itself to achieve satisfactory performance for sequential data prefetches. One example of these types of modifications is the creation of a "microcache" within the existing LRU cache to hold the sequential data.

Modifying existing LRU caches is not always a plausible solution. For instance, in legacy systems it may not be possible or desirable to modify the replacement algorithm of the cache. The cache logic or controller may be inaccessible or hardwired, or the system the cache resides on may have been provided for a specific purpose that modifying the cache would disrupt.

Accordingly, a need exists in the art for a method of scheduling prefetches of sequential data into a native LRU cache without directly modifying the algorithm or structure of the LRU cache.

OBJECTS AND BRIEF SUMMARY OF TEIE INVENTION

The data prefetch scheduling system and method of the present invention has been developed in response to the present state of the art, and in particular, in response to the problems and needs in the art that have not yet been fully solved by currently available cache management systems. Accordingly, it is an overall object of the present invention to provide a data prefetch scheduling system and method that overcomes many or all of the above-discussed shortcomings in the art.

To achieve the foregoing object, and in accordance with the invention as embodied and broadly described herein in the preferred embodiment, an improved data prefetch scheduling system and corresponding method are provided. The prefetch scheduling system of the present invention allows for prefetching a stream of sequential data based upon the expected residency time/occupancy time of objects within an existing native least-recently-used (LRU) cache system.

Under the method of the present invention, a stream of Input/Output (I/O) requests between a host and a cache is intercepted, and requested data elements are examined. If logically successive data elements of the I/O stream are not already resident within the LRU cache, the prefetch scheduling system may selectively prestige data elements into the LRU cache. The expected contents of the preexisting LRU cache is tracked, and the information is used to quantify the expected value of prefetching a given data element.

In determining whether to prestage a data element, the requested data element is assigned a priority value based upon its likelihood to be sequentially accessed, or used by the host while within the cache. The priority value is assigned in one embodiment based upon the number of logically preceding data elements present in the cache according to the model of the cache. The assigned priority value is compared against a threshold value to determine if the requested data element is to be prefetched. If the value assigned to the data requested is greater than the threshold value, the prefetch scheduling system schedules one or more prefetches of logically successive data elements.

Scheduling a prefetch may comprise sending an Input/Output (I/O) request for the logically successive data element to the preexisting LRU cache, which then loads the successive data element into the cache. Because the successive data element was unsolicited by the host processor, the data element is ignored by the host processor.

The threshold value is preferably dynamic and is adjusted periodically as needed, according to the history of prefetched data elements within the cache. If prefetched data elements have a history of being hit more than other data elements within the cache, the threshold value is decremented, and if prefetched data elements are falling out of the cache without being hit at a greater rate than other elements, the threshold value is incremented.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
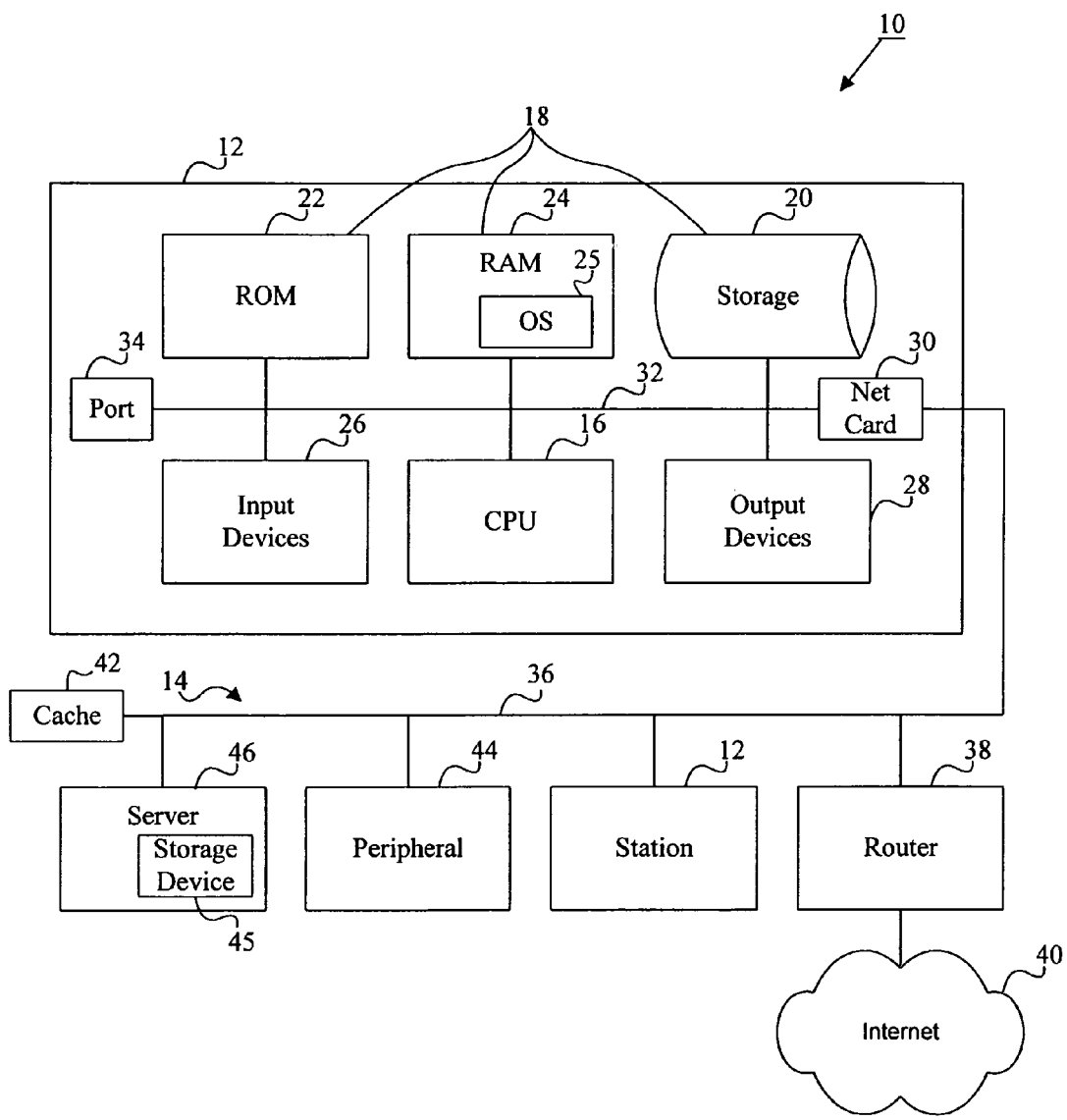
FIG. 1 is a schematic block diagram of a computer system suitable for implementing certain embodiments of the present invention.

FIG. 1 is a schematic block diagram illustrating a computer system 10 in which executable and operational data, operating in accordance with the present invention, may be hosted on one or more computer stations 12 in a network 14. The network 14 preferably comprises a storage area network (SAN) but may also comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIX®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a storage area network (SAN), local area network (LAN), a wide area network (WAN), several adjoining networks, an Intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., fiber channel, ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise data storage servers 46 and/or data storage devices 45 to which may be connected an existing least-recently-used (LRU) cache 42. In the depicted embodiment, the cache 42 is a stand-alone module remote to both the station 12 and the server 46, but, of course, could be implemented within a station 12 or a server 46, including a storage server. Other resources or peripherals 44, such as printers and scanners may also be connected to the network 36. Other networks may be in communication with the network 14 through a router 38 and/or over the Internet 40.

Figure 2:
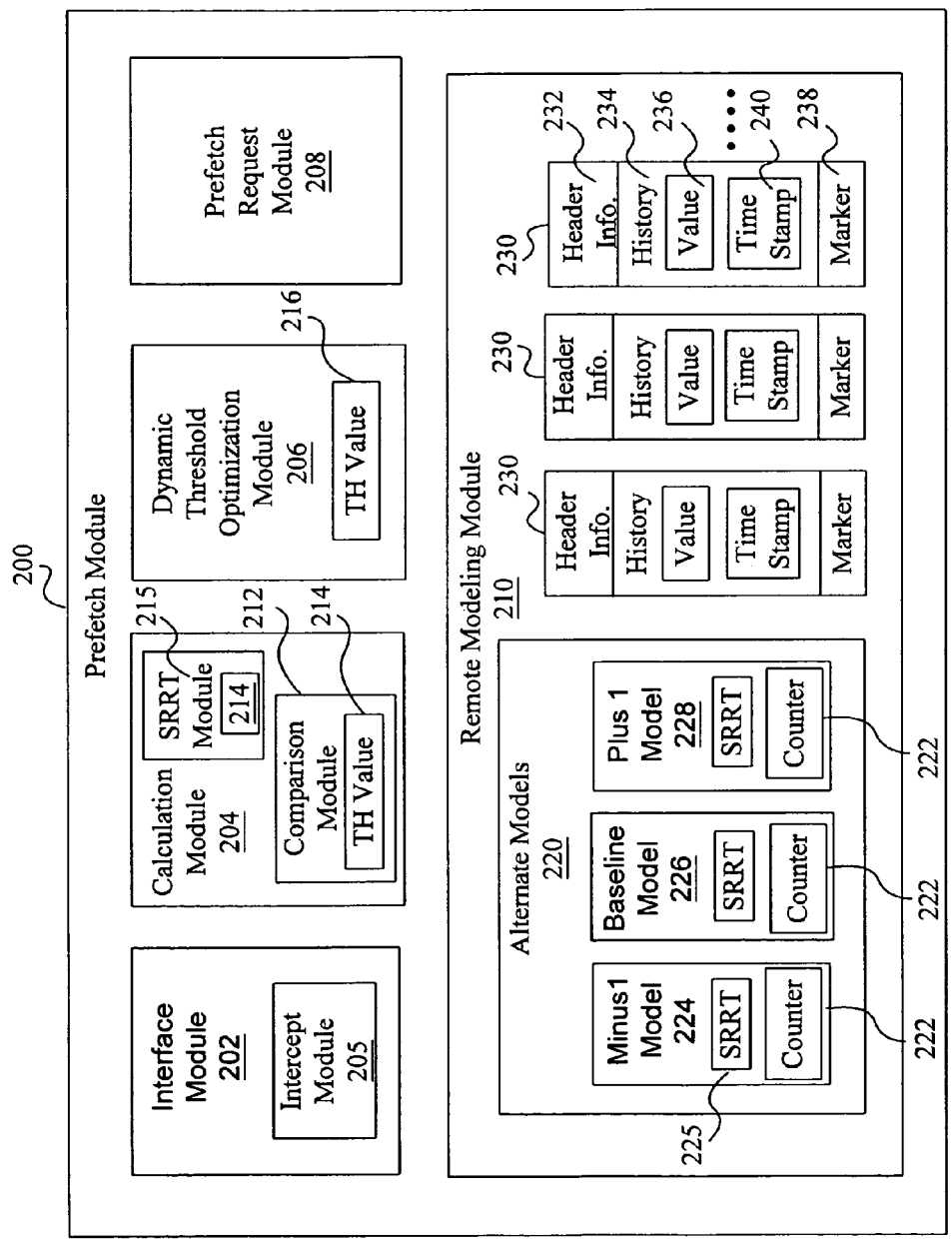
FIG. 2 is a schematic block diagram illustrating one embodiment of a data prefetch module of the present invention.

FIG. 2 is a schematic block diagram illustrating one embodiment of a prefetch module 200, suitable for use in a data prefetch scheduling system. In accordance with the invention, the data prefetch scheduling system may also include a station 12, a cache 42, and a server 46 of FIG. 1. In one embodiment, sequential data stored in a storage device 45 of the server 46 is prestaged into the cache 42 of FIG. 1 using the prefetch module 200. The prefetch module 200 may reside anywhere in the computer system 10, and in a preferred embodiment resides as a daemon on the computer station 12 of FIG. 1. More preferably, however, the prefetch module 200 is located on or between the computer station 12 (the "host") and the data storage server 46 of FIG. 1, and most preferably, the prefetch module 200 operates on a processor of the computer station 12. The prefetch module 200, as depicted, is configured with an interface module 202, a calculation module 204, a dynamic threshold optimization module 206, a prefetch request module 208, and a remote modeling module 210.

The remote modeling module 210 preferably models the operation, and to the extent known, the contents of the cache 42 of FIG. 1. The data prefetch module 200 preferably uses the information from the modeling module 210 to schedule prefetches of sequential data from the main memory of the data storage server 46 into the LRU cache 42. The data prefetch module 200 maintains one or more models 220 of the LRU cache 42 of FIG. 1 and in conjunction with those models 220, stores information about each data element in the cache as objects 230.

Each of the objects 230 preferably contains information about an individual data element of the cache 42 of FIG. 1. In one embodiment, each object 230 stores a header 230 identifying the data element modeled by the object 230. Each object 230 may also store a history 234 of the represented data element. In one embodiment, the history 234 is represented by a priority value 236 assigned to the data element. A marker 238 indicating whether the data element 223 was stored as a result of a prefetch operation or not may also be stored within the object 230. A time stamp 240 indicating when a data element first entered the cache is also preferably present within each object 230. Of course, other data that may be needed to accurately model each data element that resides within the cache 42 of FIG. 1 may likewise be stored in or with the objects 230.

In a most basic embodiment, one remote model 220 of the operation of the cache is maintained within the remote modeling module 210. The remote model 220 preferably models the contents and operation of the cache. The model 220 is preferably remote to the cache 42 in that it is not physically within the cache 42 and is preferably also not logically part of the original cache 42 which, as stated, may be a preexisting and internally unmodified LRU cache. The cache may be thought of in one embodiment as a "black box," the contents of which are remotely modeled, but which is external to the prefetch module 200.

The objects 230 modeled as being within the cache according to the model 220 are linked to the remote model 220 with a data structure, such as a pointer. Within the model 220 or associated with the model 220 is a calculated single reference residency time (SRRT) 225 for the cache. The SRRT 225 is used to determine when an object has fallen out of the cache. For instance, in one embodiment, when the time stamp 240 for an object 230 is found to exceed the SRRT of the cache 42, that object 230 is removed from the model 220 of the cache. A counter 222 may also be present within the model 220 to store hit rates, as will be described below.

The interface module 202 is shown provided with an intercept module 205. The intercept module 205 is preferably programmed or otherwise configured to receive either periodic statistical data or to receive statistical data periodically from the cache 42 of FIG. 1. This data may comprise the hit rate of the cache 42 of FIG. 1, the cache size of the cache 42 of FIG. 1, and the Input/Output (I/O) rate of the cache 42 of FIG. 1. This data is then passed to a SRRT module 215 of the calculation module 204. The SRRT module 215 calculates the SRRT 225 For the model 220. The calculation module 204 is also preferably provided with a comparison module 212 that is programmed or otherwise configured to receive the priority value 236 of a data element and to compare that priority value 236 to a threshold value 214 to determine whether the priority value is greater than the threshold value 214. This determination is then used to determine whether to prefetch the data element, as will be explained.

The intercept module 205 is preferably configured to monitor the transmission of data between the host 12 and the cache 42 and to intercept I/O requests. Other I/O requests to the cache 42 from other stations 12 may not be intercepted. The intercepted I/O requests are then examined for data elements requested to be transferred. Briefly, when such a data element is requested, the calculation module confers with the remote modeling module 210 to determine how many logically adjacent preceding data elements are present within the cache, and if sufficient preceding data elements are present, notifies the prefetch request module 208 to schedule a prefetch of the next n logically successive data elements. The variable n is the numeral 1 in one embodiment, but could be any number and is in one embodiment experimentally determined for optimal operation of the cache 42.

In one embodiment, the prefetch request module 208 requests the prefetch by issuing an artificial I/O command that is not solicited by the host processor 16 and as such is ignored by the processor 16. The cache 42, however, is "fooled" into believing that a real I/O request has been made and fetches the data element from the storage device 45, keeping a copy in the cache 42.

In one embodiment, the comparison module 212 compares a priority value 236 of the requested data element and compares it to a threshold value 214 to make the determination whether it is likely that successive data elements will be requested by the host 12. The priority value 236 is, in one embodiment, calculated according to the number of logically adjacent preceding data elements that are present in the model 220 of the cache. The threshold value is first calculated and then continually optimized by the dynamic threshold optimization module 206 in a manner that will be described below.

In a second, more preferred embodiment, a plurality of models 220 are maintained within the remote modeling module 210. These models in one embodiment comprise a minus model 224, a baseline model 226, and a plus 1 model 228. In the baseline model 226, the operation of the cache 42 is modeled using the current threshold value 214. In the minus 1 model 224, the cache is modeled using the current threshold value minus one whole value. In the plus 1 model, the cache is modeled using the current threshold value plus one. Periodically, as will be explained, the dynamic threshold optimization module 206 compares the operation of the three models 224, 226, 228 and updates the threshold value 214 according to which of the three values is at the time providing the most optimal performance of the cache.

Figure 3:
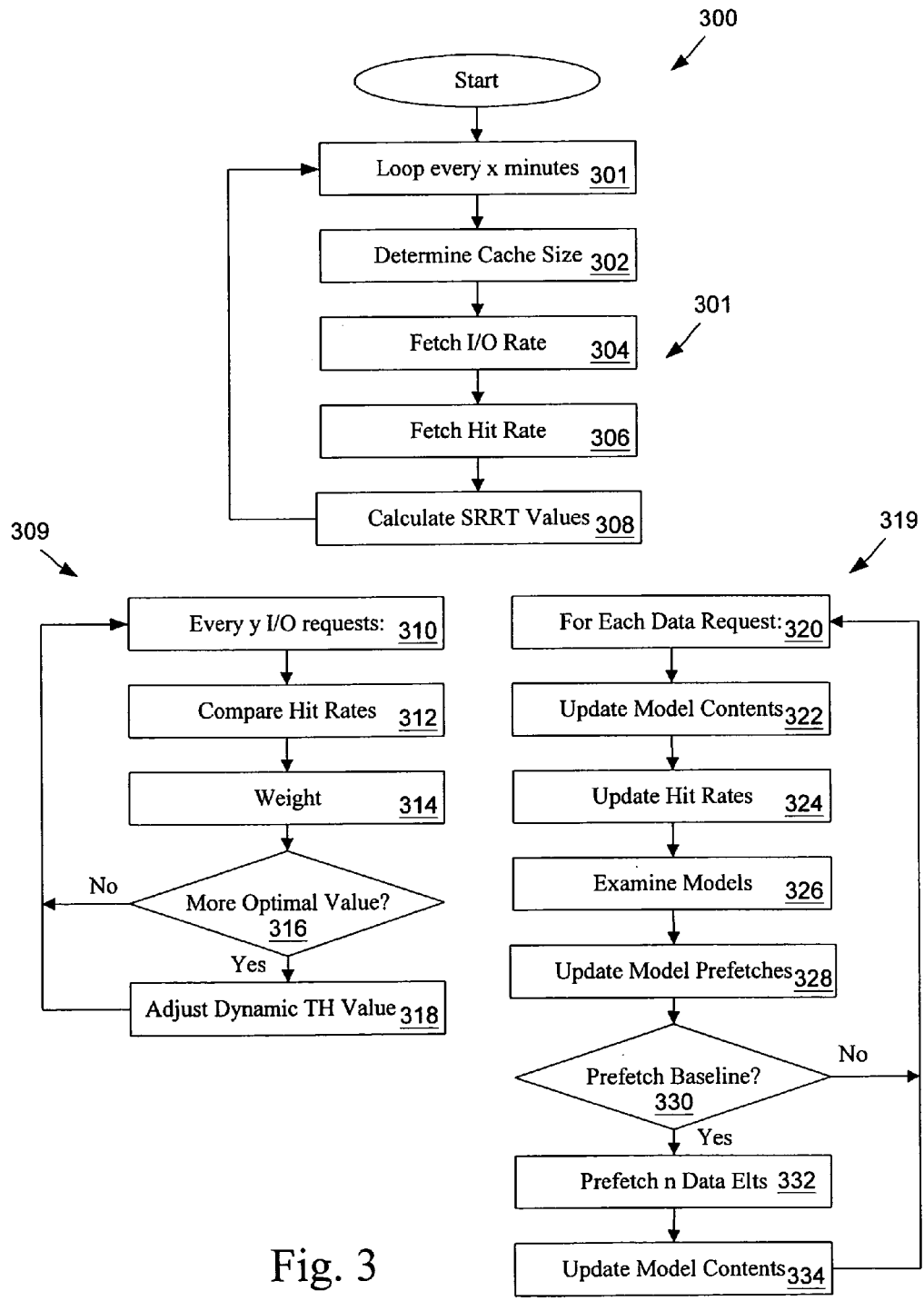
FIG. 3 is a schematic flow chart diagram illustrating one embodiment of a data prefetch scheduling method of the present invention.

FIG. 3 is a schematic flow chart diagram illustrating one embodiment of a data prefetch scheduling method 300 of the present invention. The method 300 in one embodiment may be considered to be the method of use of the prefetch module 200 of FIG. 2, but may also be used independent of the prefetch module 200 of FIG. 2. In one embodiment, the method 300 operates with three concurrent operations, denoted at 301, 309, and 319. The method 300, may upon initialization, step through each step 302–334 in sequence, and after that, the separate operations may loop separately.

The data prefetch scheduling method 300 preferably remotely models the performance of the LRU cache 42 of FIG. 1, and in so doing the interface module preferably periodically retrieves performance and statistical data from the LRU cache 42 of FIG. 1. In a step 302, the size of the LRU cache 42 is determined and is preferably measured in units of I/O requests. The size of the LRU cache 42 is preferably fetched from the LRU cache 42 through the interface module 202, but may be determined in other manners such as preprogramming or direct user entry. A step 301 indicates that after the first iteration of the steps 302–308, the operation 309 loops at intervals such as every x minutes, where x may be any number and is in one embodiment one minute. Of course, if the cache size is static, step 302 need be conducted only one time upon startup.

The Input/Output (I/O) rate of the cache 42 of FIG. 1 is fetched from the cache 42 of FIG. 1 by the interface module 204 of FIG. 2 in a step 304. The I/O rate refers to the number of I/O requests sent to the cache 42 of FIG. 1 by one or more computer stations 12 of FIG. 1 in a given period of time. The I/O rate includes both hits and "misses" in the cache. The hit rate of the cache 42 of FIG. 1 is also preferably fetched from the cache 42 of FIG. 1 by the interface module 202 of FIG. 2 in a step 306. The hit rate refers to the the number of I/O requests, i.e., "hits," that were found to reside in the cache at the time of the I/O request over a given period of time. The hit rate may also be used to determine a miss ratio for the cache where the miss ratio is one minus the hit rate divided by the number of I/O requests.

The hit rate, in the preferred embodiment, is calculated based upon a logarithmic rate of increase with increased cache size. Calculating the hit rate from the cache size in this manner is necessary, because hit rates do not typically increase in a linear manner with an increasing cache size. Thus, a logarithmic rate of increase is considered a close approximation of the hit rate v. cache size, where the hit rate is estimated to increase at an increasingly lower rate with the increase in cache size.

Once the cache size, I/O rate, and hit rate are fetched, the calculation module 204 of FIG. 2 preferably uses this data to calculate the SRRT 216, which is an approximation of the average time it takes a data element that has been fetched into the cache to "fall through" or be removed from the cache 42 of FIG. 1. The SRRT 216 is later used at a step 322 to determine which data elements have "fallen out of the cache."

In a preferred embodiment, the SRRT is calculated by estimating the hit rate for all cache sizes 1 to n, where n is the size of the cache as determined in the step 302, and is adjusted downward by the portion of the cache assumed to be holding prefetched requests. Then, using the estimated hit rate of the different cache sizes, the miss ratio for all cache sizes to n is calculated. This is done by assuming that the effectiveness of the cache decays exponentially in relation to the size of the cache. Subsequently, using the I/O rate of the cache, the miss ratio of the cache, and the expected miss ratio for the cache one size smaller, the SRRT is calculated using Formula 1, $$\frac{1}{r}\left(1 + p + \frac{n-1}{m(n-1)}\right) \quad \text{Formula 1}$$

where r is the I/O rate of the cache, p is the number of prefetches conducted by the prefetching algorithm, n is the size of the cache as determined in the step 302, and m[i] is the expected miss ratio of the cache when the cache is of size i. Of course, other methods exist for calculating the SRRT for an LRU cache and may be used in place of Formula 1. The steps 304, 306 and 308 of the data prefetch scheduling method 300 are preferably performed periodically as indicated by the step 301. In the embodiment described above, where a plurality of model 220 is maintained, the SRRT that would occur under operation of each model 220 is calculated. Thus, in the depicted embodiment of FIG. 2, three SRRT values are calculated at the step 308 for every iteration of the operation 301.

The second operation 309, consisting of the steps 310–318, is initially conducted after the operation 301 and then at intervals as determined by the step 310. In one embodiment, the operation 309 is conducted upon the occurrence of every y intercepted I/O requests, where y may be determined experimentally. In one embodiment, y comprises 10,000. In the initial iteration of the operation 309, as data may not exist, a preselected threshold value may be used and the steps 310–318 skipped. Otherwise, stored data may be used.

At a step 312, the expected (i.e., modeled) hit rates of prefetched data of the various models 220 (i.e., 224, 226, 228) are compared. The results may then optionally undergo weighting or other conditioning at a step 314 to determine trends so that the threshold value 214 does not change too rapidly. At a step 316, the various, expected hit rates are assessed to determine whether there is a more optimal threshold valve. If one of the models other than the baseline model 226 has a higher expected hit rate, the value (e.g., threshold minus 1 or 1 threshold value plus 1) corresponding to that model then affects the weighting process, which determines the threshold value to be used as the new current threshold value 214. In one embodiment, the hit rate that are to be compared are stored as counters 222 within each of the models 220 and are updated at a step 324 as will be described.

Figure 5:
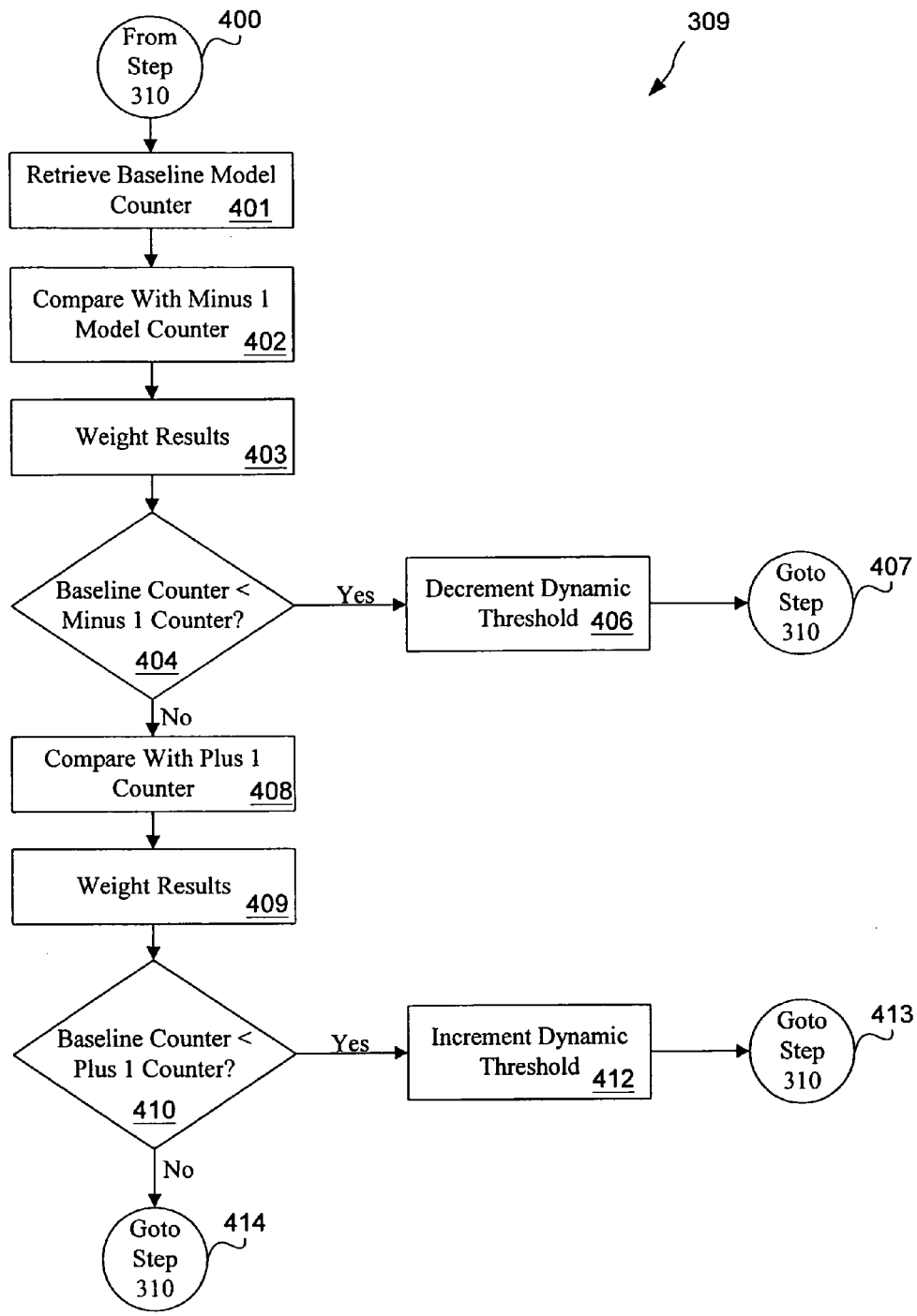
FIG. 5 is a schematic flow chart diagram illustrating one embodiment of a method for determining and updating a threshold value of the present invention.

FIG. 5 illustrates in greater detail, one embodiment of a method for conducting the threshold value update operation 309 of FIG. 3. The method of FIG. 5 begins at step 400, and is conducted every y I/O request, as indicted by step 310 on FIG. 3. At step 401, the hit rate counter 222 of the baseline model 226 of FIG. 2 is retrieved. At a step 402, the baseline model counter is compared with the hit rate counter 222 of the minus 1 model 224. At a step 403, the results are weighted. That is, the results may be averaged over every m iterations of the operation 309. At a step 404, the results are observed. Thus, after the weighting, if the baseline counter is determined to be less than the minus 1 counter, the dynamic threshold is decremented by one integer value at a step 406. The operation 309 then returns to step 310 as indicated at 407. If the results of the observation of step 404 are negative, the baseline counter is compared with the hit rate counter of the plus one model 228 at a step 408. Similarly, the results are weighted at a step 4.09. If, in the weighted results, the baseline counter is less than the plus 1 counter, the dynamic threshold is incremented as indicated at a step 412, and the operation 309 returns back to the step 310 as indicated at 413. If the result of the query of step 10 is no, the operation 309 also returns directly to step 310 as indicated at 414.

Once a threshold value has been selected and/or optimized, the method 300 proceeds to the third operation 319. The operation 319 is also initially conducted in sequence with the operations 301 and 309 and then is conducted independently as date requests are intercepted. At a step 320, the operation 319 waits for the intercept module 205 to intercept an I/O request. When an I/O request is intercepted, a data element requested from the storage device 45 or other source is extracted. The models 220 are then updated at a step 322. This preferably comprises comparing the timestamps of the objects 230 within each of the models 220 to determine which have exceeded the SRRT for that model. Those exceeding the SRRT are removed from the model as being likely to have been removed from the cache 42 under that model. Of course, the step 322 could be conducted at any time, and could be a separate independent operation. In one embodiment, this step is repeated later as indicated by step 334.

At a step 324, the hit rates are updated. In one embodiment, this comprises examining the data element identified at the step 320 and comparing that data element to each of the models 220. If the data element is within a model and is marked with the marker 238 as having been prefetched, the counter 222 of that model is incremented.

At a step 326, the models 224, 226, 228 are examined to see if the data element logically preceding the intercepted data element is present within each model. At a step 328, it is determined whether a prefetch of the successive data element(s) is to be conducted according to each of the models 220 and the models 220 are separately updated according to the results of the determination. One embodiment of a method of achieving this process is illustrated in greater detail in FIG. 4.

Figure 4:
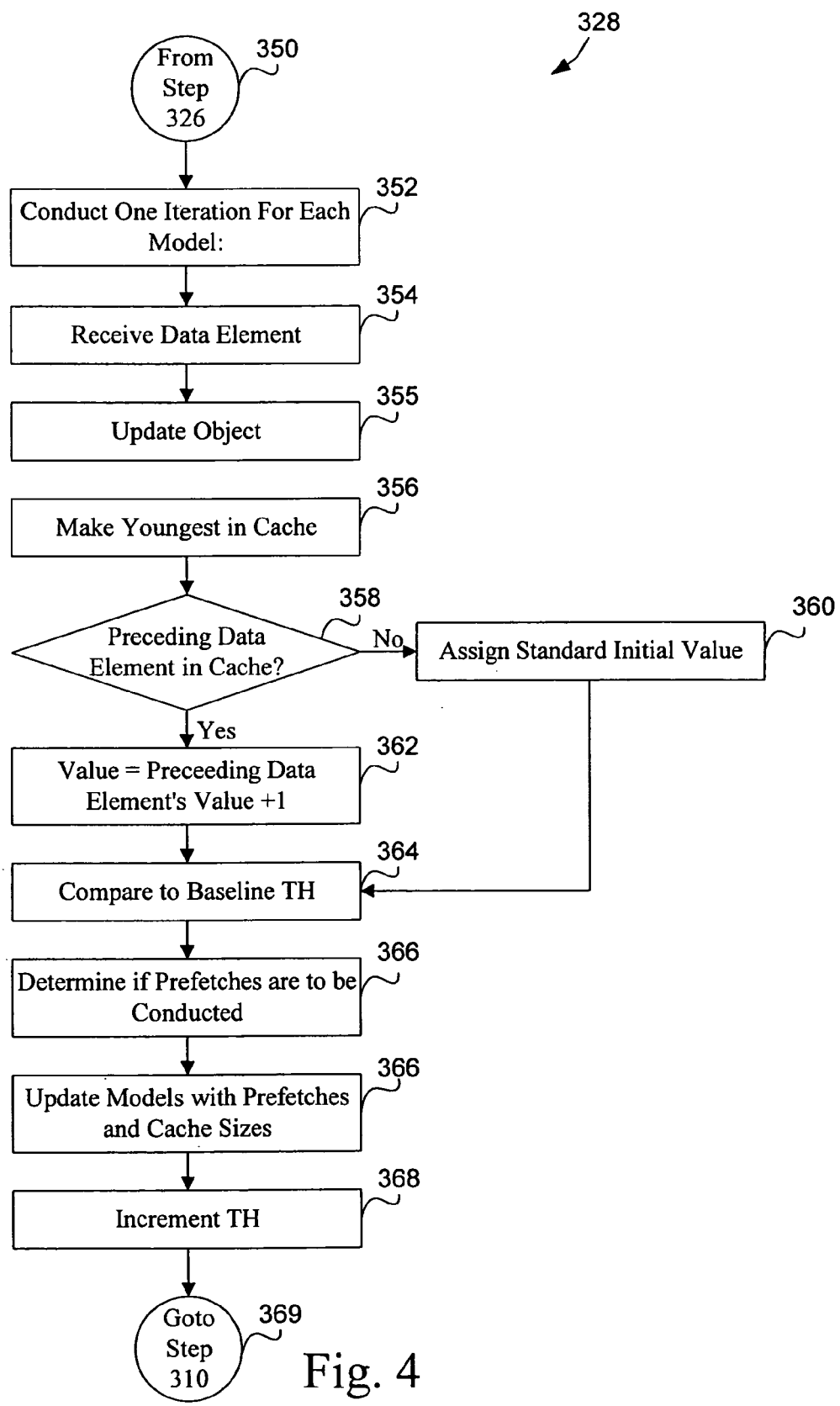
FIG. 4 is a schematic flow chart diagram illustrating one embodiment of a data prefetch determination of the method of FIG. 3.

Referring to FIG. 4, at a step 350 the method begins, and as indicated at a step 352, is conducted for each of the models 220, beginning with the minus 1 model 224. At a step 354, the data element is received into the prefetch module a; an object 230. At a step 355, an object 230 is created or updated, depending on whether the data element is already in the cache. In so doing, a timestamp 240 is applied and a header 232 is assigned. The marker 238 is also set to indicate whether the data element was prefetched or not. The data element is modeled as being the youngest element in the cache 42, as indicated at a step 356, in accordance with how the cache 42, being a LRU cache, literally treats the data element.

At a step 358, the prefetch module 260 determines whether the logically preceding 2 data element is present in the cache 42. If so, at a step 360, the data element is assigned a 4 value for the respective model, which in one embodiment comprises the priority value 236 of the logically preceding element plus one (optionally up to some maximum value selected to prevent overflow). Because each preceding element was similarly updated, the priority value 236 thus represents the amount of preceding data elements stored in the model. Thus, the object 230 corresponding to the data element may be given a separate value 236a, 236b, 236c, for each of the models 220 as the method 238 is conducted for each of the models 220. If the immediately preceding data element is not present in the cache, at a step 360, a standard initial priority value is assigned to the object 230 corresponding to the intercepted data element. In one embodiment, this value is 1.

Thereafter, at a step 364, the assigned priority value of the data element is compared 17 to the threshold valve of the model for which the iteration is being conducted, preferably by the calculation module 204. At a step 366, the calculation module 204 determines whether a prefetch is to be scheduled. If the priority value 236 of the object is equal to or greater than the threshold value 214, a prefetch is considered to have been scheduled and the model is updated accordingly at a step 366. Also at the step 366, the size of the cache in each model 220 is updated. This preferably comprises subtracting the number of prefetched elements from the cache size of step 302 and using the new cache size for future calculations of the SRRT for the model.

Returning to FIG. 3, at a step 330, the operation 319 determines whether the prefetch of the data element is to be conducted according to the baseline model. That is, is the priority valve assigned to the data element greater than the threshold valve? If so, at a step 332, the prefetch is scheduled. Scheduling the prefetch preferably comprises passing an unsolicited I/O request to the cache 42, as discussed above.

In accordance with the present invention as described above, it should be apparent that sequential prefetching of data in a preexisting and/or dedicated LRU cache can now be conducted without significant likelihood of the prefetched data falling out of the cache before being re-referenced. Additionally, this can be accomplished with minimum interference to the "normal" operation of the cache and without having to internally modify the LRU cache or the native operation of the LRU cache. Accordingly, such caches can be enhanced for greater performance with the use of the method and system of the present invention merely with, in one embodiment, the addition of software to a host or between the cache and the host.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for scheduling prefetches into a Least Recently Used (LRU) cache of a data storage system, the method comprising:
   remotely modeling dynamic operation of the LRU cache in a model, the model including a model of data elements currently stored within the LRU cache;
   assigning a priority value to modeled data elements according to their history;
   assigning a priority value to a requested data element based at least partially on whether a preceding data element is present in the LRU cache;
   making a cache management decision based upon the model comprising;
      intercepting a request for a data element from a stream of Input/Output (I/O) data requests sent from a host and addressed to the LRU cache; and
      determining whether to schedule a prefetch of a data element logically successive to the requested data element in accordance with contents of the LRU cache as indicated by the remote model; and
   executing prefetches into the LRU cache in response to select cache management decisions.

2. The method of claim 1, wherein the LRU cache is a native LRU-only cache, and further comprising the step of leaving the native LRU-only cache substantially unmodified while conducting the steps of claim 1.

3. The method of claim 1, wherein remotely modeling the LRU cache further comprises:
   determining a size of the LRU cache;
   periodically fetching an LRU cache I/O rate of from the LRU cache; and
   periodically fetching an LRU cache hit rate of from the LRU cache.

4. The method of claim 1, wherein remotely modeling the LRU cache further comprises periodically calculating a single reference residency time (SRRT) for the data element within the LRU cache.

5. The method of claim 1, wherein assigning a priority value further comprises assigning a priority value comprising the priority value assigned to the preceding data element plus one when the preceding data element is found to be present in the LRU cache.

6. The method of claim 1, wherein determining whether to schedule a prefetch of the data element further comprises comparing the priority value of the requested element with a dynamic threshold.

7. The method of claim 6, further comprising prefetching the requested data element into the LRU cache if the priority value of the requested data element is greater than the dynamic threshold.

8. The prefetch method of claim 1, further comprising periodically reevaluating the performance of the remote model.

9. The method of claim 8, wherein periodically reevaluating the performance of the remote module further comprises determining is a dynamic threshold used in the remote module of the LRU cache accurately models the performance of the LRU cache.

10. The method of claim 9, wherein determining if the dynamic threshold accurately models the performance of the LRU cache comprises comparing the performance of the dynamic threshold with an alternate dynamic threshold.

11. The method of claim 8, further comprising automatically updating a dynamic threshold used in the remote model of the LRU cache when another dynamic threshold is deemed to be more effective.

12. The method of claim 1, wherein making a cache management decision comprises deciding to schedule a prefetch, and further comprising scheduling a prefetch by sending an I?O request to the LRU cache.

13. A method for scheduling prefetches in a data storage system having a host and a cache, the method comprising the steps of:
   providing a cache for caching Input/Output (I/O) data;
   providing a prefetch module remote to the cache;
   remotely modeling the cache within the prefetch module and determining whether to schedule a prefetch of data into the cache according to the results of the step of remotely modeling the cache, the step of remotely modeling the cache module further comprising:
      examining the history of a data element in the cache;
      assigning a priority value to the data element according to its history;
      comparing that priority value to a predetermined threshold value;
      determining a size of memory used in the cache;
      periodically fetching an I/O rate of the cache from the cache;
      periodically fetching a hit rate of the cache from the cache; and
      determining a single reference residency time for a data element within the cache;
   intercepting a stream of I/O information from the host to the cache to locate a requested data element;
   determining if the requested data element in the stream of I/O information is already present within the cache;
   making the requested data element a youngest member of the cache;
   determining if the data element preceding the requested data element is present in the cache;
   assigning a priority value to the requested data element;
   periodically reevaluating the performance of the cache versus an internal model of the cache if the number of I/O requests received by the cache is greater than a predetermined number;
   updating the dynamic threshold used in the internal model of the cache if the dynamic threshold value does not adequately model the performance of the cache;
   comparing the priority value of the requested data element with the dynamic threshold value; and
   prefetching the requested data element if the priority value of the requested data element is greater than the dynamic threshold value by passing an I/O request of the data element to the cache.

14. A data prefetch scheduling system comprising:
   An LRU cache configured to communicate with a host; and
   a remote prefetch module configured to communicate with the host and the LRU cache, intercept a stream of Input/Output (I/O) information from the host to the LRU cache to locate a requested data element and further configured to determine whether to schedule a prefetch of data into the LRU cache, wherein the determination to prefetch data is at least partially determined based on whether a data element preceding a requested data element is present in the LRU cache;
   a modeling module operating within the remote prefetch module configured to model the LRU cache, including providing a model of data elements currently stored within the LRU cache, wherein each data element is assigned a priority value according to its history; and a prefetch request module configured to request a data I/O from the LRU cache when the remote prefetch module determines that a prefetch is to be conducted.

15. The data prefetch scheduling system of claim 14, wherein the cache comprises a least recently used (LRU) cache.

16. The data prefetch scheduling system of claim 15, wherein the LRU cache is a native LRU-only cache that is not internally modified.

17. The data prefetch scheduling system of claim 14, wherein the remote prefetch module further comprises a calculation module configured to compare the priority value assigned to a data element to a threshold value and determine whether to schedule a prefetch of the data element.

18. The data prefetch scheduling system of claim 14, wherein the remote prefetch module further comprises a dynamic threshold optimization configured to calculate and update a dynamic threshold used in determining whether to prefetch data.

19. The data prefetch scheduling system of claim 14, wherein the remote prefetch module is configured to model the LRU cache for use in determining when to prefetch I/O data into the LRU cache.

20. The data prefetch scheduling system of claim 14, wherein the remote prefetch module is configured to prefetch data into the LRU cache according to a priority scheme that takes into account the run length of each sequential I/O stream.

21. A remote prefetch module for determining whether to schedule a prefetch of data into a Least Recently Used (LRU) cache of a computer system, the prefetch module comprising:
a modeling module configured to model dynamic operation of the LRU cache;
wherein the modeling module is further configured to provide a model of data elements currently stored within the LRU cache, wherein each data element is assigned a priority value according to its history and requested data elements are assigned a priority value based at least partially on whether a preceding data element is present in the LRU cache; and
a calculation module configured to make a cache management decision based upon the model, wherein the cache management decision is at least partially determined based on intercepting a stream of I/O information from a host to the LRU cache to locate a requested data element and is further based on whether a data element preceding the requested data element is present in the LRU cache.

22. A computer station on a computer network, wherein the computer station is configured to communicated with a Least Recently Used (LRU) cache coupled to a storage device of the computer network, the computer station comprising:
a processor; and
a memory configured to store data structures comprising:
a modeling module configured to model dynamic operation of the LRU cache;
wherein the modeling module is further configured to provide a model of data element currently stored within the LRU cache, wherein each data element is assigned a priority value according to its history and requested data elements are assigned a priority value based at least partially on whether a preceding data element is present in the LRU cache; and
a calculation module configured to make a cache management decision based upon the module, wherein the cache management decision is at least partially determined based on intercepting a stream of I/O information from a host to the LRU cache to locate a request data element and is further based on whether a data element preceding a requested data element is present in the LRU cache.

23. A computer readable medium comprising executable data structures
configured to carry out a method for scheduling prefetches into a Least recently Used (LRU) cache of a data storage system, the method comprising:
remotely modeling dynamic operation of the LRU cache in a model, the model including a model of data elements currently stored within the LRU cache;
assigning a priority value to modeled data elements according to their history;
assigning a priority value to a requested data element based at least partially on whether a preceding data element is present in the LRU cache;
making a cache management decision based upon the model;
executing prefetches into the LRU cache in response to select cache management decisions; and
assigning the requested data element as status corresponding to a youngest member of the LRU cache.

24. A data prefetch scheduling system comprising:
a means for remotely modeling dynamic operation of the an LRU cache in a model, the remotely modeling including providing a model of data elements currently stored within the LRU cache;
a means for assigning a priority value to modeled data elements according to their history;
a means for assigning a priority value to a requested data element based at least partially on whether a preceding data element is present in the LRU cache;
a means for making a cache management decision based upon the model comprising;
a means for intercepting a request for a data element from a stream of Input/Output (I/O) data requests sent from a host and addressed to the LRU cache;
a means for determining whether to schedule a prefetch of a data element logically successive to the requested data element in accordance with contents of the LRU cache as indicated by the remote model; and
a means for executing prefetches into the LRU cache in response to select cache management decisions.

* * * * *